United States Patent
Abe et al.

(10) Patent No.: US 7,255,830 B2
(45) Date of Patent: Aug. 14, 2007

(54) METHOD OF MAKING A THREE-DIMENSIONAL SINTERED PRODUCT

(75) Inventors: Satoshi Abe, Moriguchi (JP); Isao Fuwa, Osaka (JP); Hirohiko Togeyama, Tondabayashi (JP); Norio Yoshida, Nara (JP); Masataka Takenami, Osaka (JP); Shuushi Uenaga, Moriguchi (JP)

(73) Assignee: Matsushita Electric Works, Ltd., Osaka (JP)

( * ) Notice: Subject to any disclaimer, the term of this patent is extended or adjusted under 35 U.S.C. 154(b) by 451 days.

(21) Appl. No.: 10/671,689

(22) Filed: Sep. 29, 2003

(65) Prior Publication Data

US 2004/0228754 A1 Nov. 18, 2004

(30) Foreign Application Priority Data

Sep. 30, 2002 (JP) .......................... P 2002-287768

(51) Int. Cl.
*B22F 3/10* (2006.01)
(52) U.S. Cl. ....................................... 419/58; 148/301
(58) Field of Classification Search .................. 419/58; 148/301
See application file for complete search history.

(56) References Cited

U.S. PATENT DOCUMENTS

| | | | | |
|---|---|---|---|---|
| 4,863,538 A | * | 9/1989 | Deckard ...................... | 264/497 |
| 4,944,817 A | * | 7/1990 | Bourell et al. ............... | 264/497 |
| 5,182,170 A | * | 1/1993 | Marcus et al. ............... | 264/497 |
| 5,385,780 A | * | 1/1995 | Lee ............................. | 428/325 |
| 5,387,380 A | * | 2/1995 | Cima et al. ................... | 264/69 |
| 5,745,834 A | * | 4/1998 | Bampton et al. ............. | 419/37 |
| 5,904,890 A | * | 5/1999 | Lohner et al. ............... | 264/401 |
| 6,066,285 A | * | 5/2000 | Kumar ......................... | 264/439 |
| 6,238,614 B1 | * | 5/2001 | Yang et al. .................. | 264/497 |
| 6,657,155 B2 | * | 12/2003 | Abe et al. ................... | 219/121.6 |
| 6,767,499 B1 | * | 7/2004 | Hory et al. .................. | 264/497 |

FOREIGN PATENT DOCUMENTS

| | | |
|---|---|---|
| JP | 2620353 | 3/1997 |
| JP | 2001-254107 | 9/2001 |
| WO | 88/02677 | 4/1988 |

OTHER PUBLICATIONS

English Language Abstract of JP 2620353.
English language Abstract of JP 2001-254107.
English Language Abstract of JP 2620353, no date.
English language Abstract of JP 2001-254107, no date.

* cited by examiner

*Primary Examiner*—Scott Kastler
(74) *Attorney, Agent, or Firm*—Greenblum & Bernstein, P.L.C.

(57) ABSTRACT

To make a three-dimensional object, an optical beam is first irradiated on a predetermined portion of a powder layer to form a sintered layer, which is then covered with a new powder layer. The optical beam is again irradiated on a predetermined portion of the new powder layer to form another sintered layer that has been united with the underlying sintered layer. These processes are repeatedly carried out to form a plurality of sintered layers united together. When the second lower density layer is formed on the first higher density layer, a powder material layer for the lower density layer is formed at a predetermined thickness so as to have a thickness suitable for sintering condition and then the powder material layer is sintered to form the lower density layer.

9 Claims, 17 Drawing Sheets

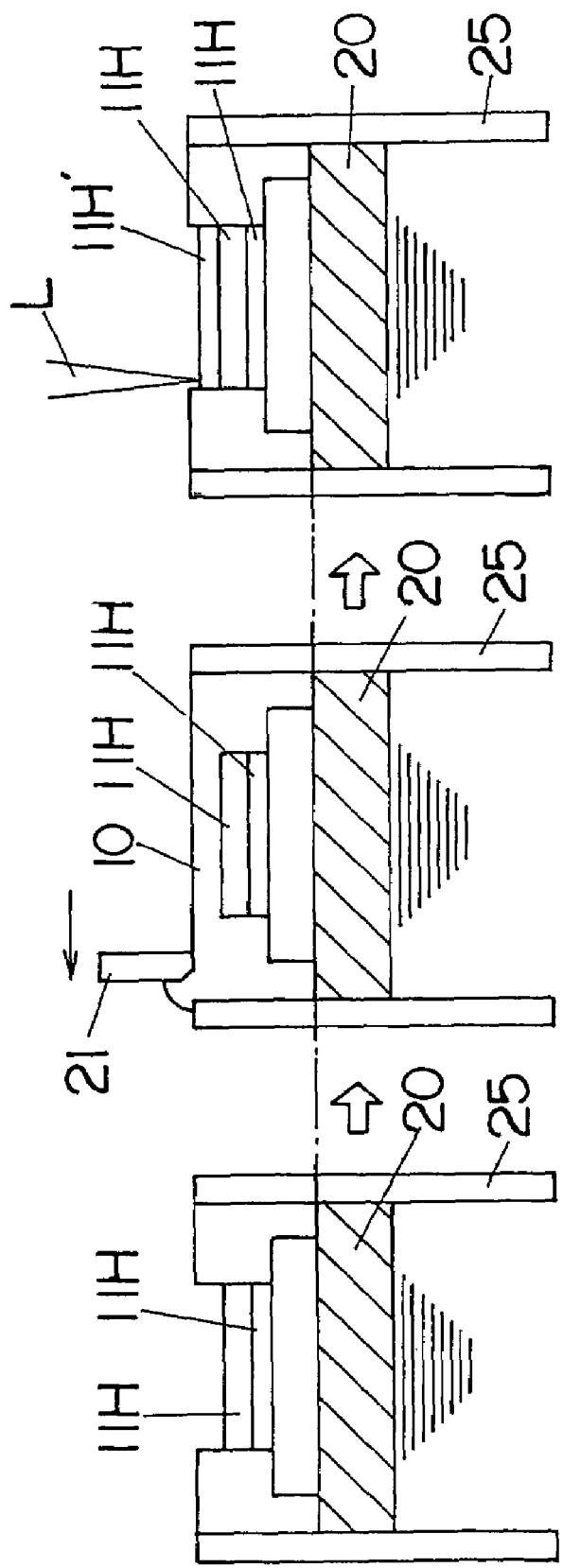

Fig. 16
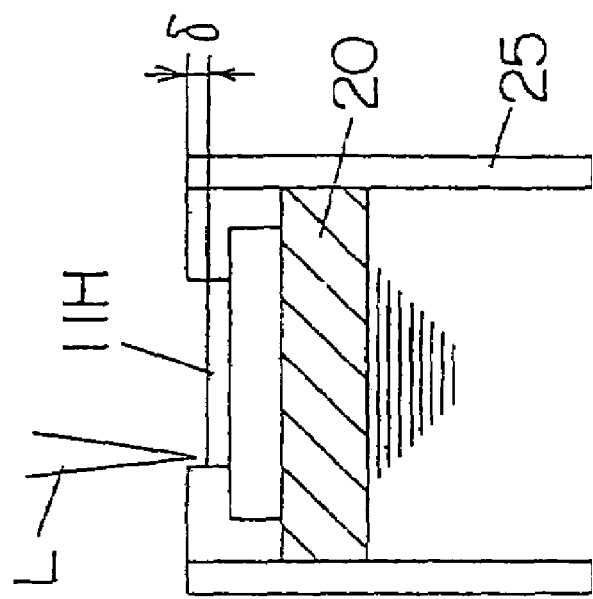
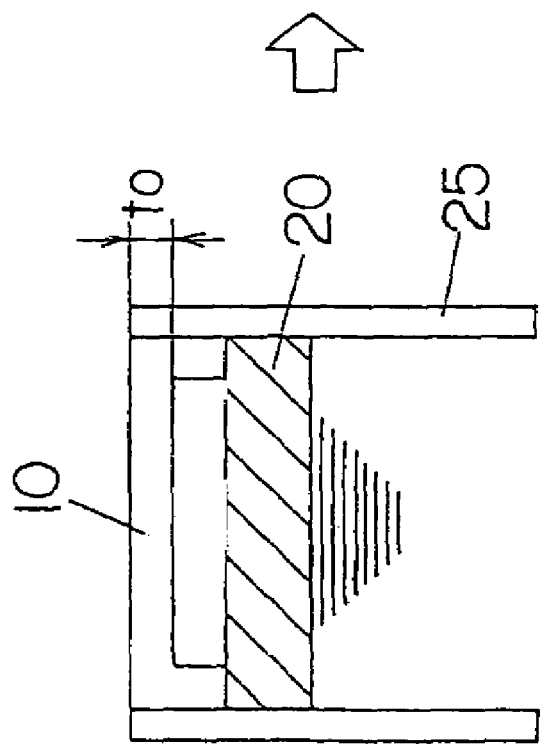
Related Art

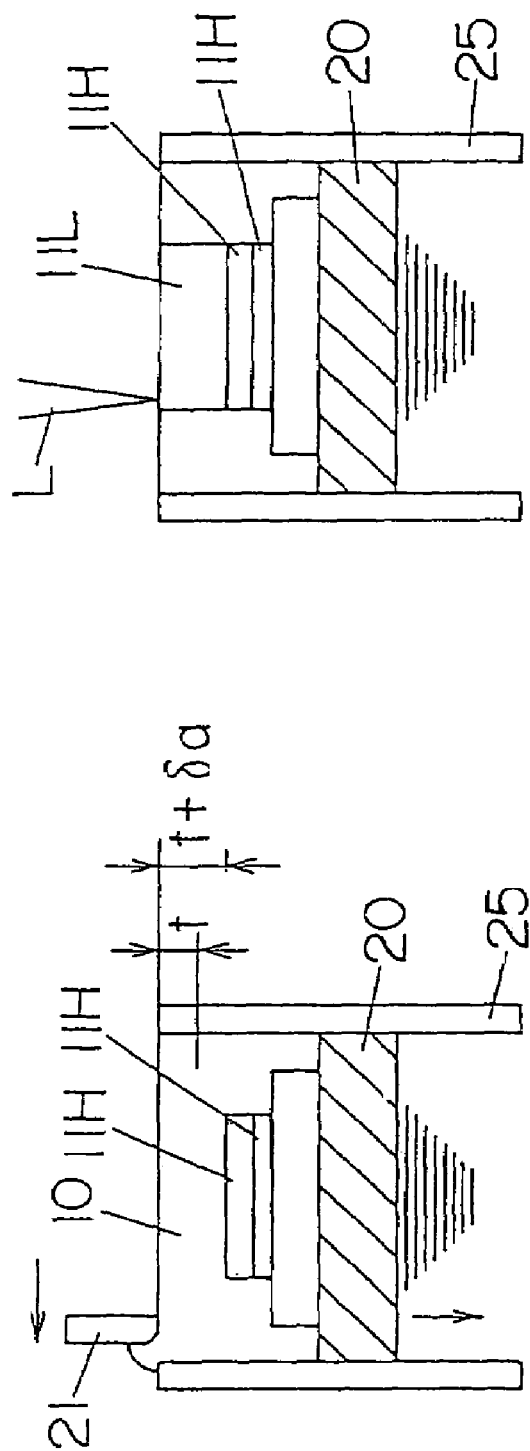

METHOD OF MAKING A THREE-DIMENSIONAL SINTERED PRODUCT

BACKGROUND OF THE INVENTION

1. Field of the Invention

The present invention relates to a method of making a three-dimensional sintered product in which a target object is obtained by sintering and hardening powder material layers with an optical beam, especially relates to a method of preparing a metal mold by uniting a plurality of lamination made of metallic powder layers sintered by a laser beam.

2. Description of the Related Art

Japanese Patent No. 2620353 discloses a method of making a three-dimensional object known as photo-shaping. According to this Patent, an optical beam L is first irradiated on a predetermined portion of a layer of powder material, which is either an organic material or an inorganic material, to form a sintered layer. The sintered layer thus obtained is then covered with a new layer of powder material, and the optical beam L is irradiated on a predetermined portion of the new layer to form a new sintered layer, which is united with the underlying layer. These steps are repeatedly carried out to form a sintered product or three-dimensional object in which a plurality of sintered layers are firmly laminated one above another. According to this method, the irradiation of the optical beam L is conducted based on sectional form data of each of the layers that are obtained by slicing a model of design data (CAD data) of the three-dimensional object into a desired thickness. For this reason, without a CAM device, the method referred to above can be used to make a three-dimensional object of an arbitrary shape and to obtain any shaped object of a desired shape quickly, compared with a conventional cutting and machining method.

According to this method, however, considering problems such as warping and cracking due to moulding times and internal stress, this method should be carried out by sintering necessary portions into a higher density and remaining portions into a lower density rather than by sintering all the portions into a same density. For example in case of metal mold for injection moulding, surface portions for transcription of object and piping portions for cooling water should be formed in a higher density and remaining portions should be formed in a lower density.

The higher density sintered layers have a very smooth finished surface due to almost complete melting and solidification, thereby keeping water proof of cooling water piping. However, the layer of powder material having a density of 50 to 60% will be sintered to the higher density layer having a density of almost 100%, so that as shown in FIG. 16, when the powder material layer 10 having a thickness of $t_0$ will be sintered into the higher density layer 11H by an optical irradiation, the surface level of the higher density layer will be lowered by a difference [δ] from the original surface level of the powder material layer.

Further, when the thickness of the powder material layer is determined by a sinking amount of the stage 20, a thickness of the powder material layer is set to a value larger than a predetermined value [t] and furthermore, when the powder material layer 10 will be sintered by a sintering condition of higher density, the resulting surface of the higher density layer will be lowered by a stage difference [δa] (difference [δa] is larger than difference [δ]).

Further, another powder material layer 10 is formed on the higher density layer 11 and sintered under a condition for the lower density to form a lower density layer 11L. As shown in FIG. 18, the powder material layer 10 becomes thicker by the above difference [δa] in this case.

In this method, since the optical beam condition for lower density is determined according to a predetermined thickness [t] of the powder material layer 10, the optical beam having a predetermined condition can not make the powder material thicker by difference [δa] than a predetermined value [t] sintered completely, thereby not giving an enough adhesive power to the resulting lower density layer which is easy to be peeled from the higher density layer.

SUMMARY OF THE INVENTION

The present invention has been developed to overcome the above-described disadvantages.

It is accordingly an objective of the present invention to provide an improved method capable of making a three-dimensional sintered product provided with a good adherence between higher density layers and lower density layers.

Another objective of the present invention is to provide the method of the above-described type, which is not capable of preparing a three-dimensional sintered product provided with lower density layer completed sintered under a predetermined condition for the lower density layer.

In accomplishing the above and other objectives, from the first aspect of the present invention, there is provided a method of preparing a three-dimensional sintered product which comprises steps of (a) sintering a predetermined portion of a first powder material layer by irradiation of an first optical beam to form a first layer having a higher density, (b) forming a second powder material layer on the first layer and (c) sintering a predetermined portion of the second powder material layer by irradiation of a second optical beam to form a second layer having a lower density and bond the second lower density layer to the first higher density layer and (d) repeating the steps (a) to (c) to form a three-dimensional sintered block comprising a plurality of the first and second layers, wherein the second sintered layer having a low-density is formed on the first sintered layer having a high-density through an additional sintered layer having a middle density between the high-density of the first sintered layer and the low-density of the second sintered layer According to the first feature of the invention, the second sintered layer having a lower density is not formed directly but through the additional layer having a middle density on the first sintered layer having a higher density, so that the bonding power between the higher density layer and the lower density layer does not become weaken due to a sequential change from the higher density to the lower density as well as no formation of the sintered layer having an insufficient lower density.

In this method, the additional sintered layer having a middle density may comprise a plural of layers wherein the density of each layers decreases in proportion to distance from the higher density layer. Smooth change of density in the middle density layers can make a smooth change of characteristics from the higher density layer to the lower density layer. In this case, a suitable sintering condition should be determined according to a thickness of powder material layer to be sintered, so that the middle density layer can be formed in a suitable sintering condition.

From a second aspect of the present invention, there is provided a method of preparing a three-dimensional sintered product comprising higher density layers and lower density layers sintered by irradiation of an optical beam on a predetermined portion of powder material layers, wherein a powder material layer for a lower density layer on at least the uppermost higher density layer is formed smaller in thickness than a usual predetermined value and is subjected to a sintering process according to a sintering condition of the lower density layer.

According to the second feature of the present invention, powder material for the lower density layer is layered to have a suitable thickness for sintering. Therefore, if the higher density layer is formed smaller than a predetermined value, a next layer of powder material is always set to have a suitable thickness for a predetermined sintering condition so that the resulting lower density layer has a good adherence.

From a third aspect of the present invention, there is provided a method of preparing a three-dimensional sintered product comprising higher density layers and lower density layers sintered by irradiation of an optical beam on a predetermined portion of powder material layers, wherein a layer of powder material for a higher density layer on at least the uppermost higher density layer is formed smaller in thickness than a usual predetermined value and is subjected to a sintering process according to a sintering condition of the lower density layer.

According to the third feature of the present invention, an additional higher density layer is formed to adjust a forming position for the lower density layer even if a higher density layer is formed smaller than a predetermined value, so that a next layer of powder material for the low density layer is controlled to have a suitable thickness for sintering, thereby forming a lower density layer having a good adherence.

In this method, a thickness of powder material layer may be determined by a sinking amount of a stage where a resulting layer is positioned and a next powder material layer is formed on the resulting layer. The additional higher density layer may be formed with no sinking amount of the stage. In this case, a time for operation of sinking the stage can be cut down.

When the lower density layer is formed on the higher density layer, a thickness of the powder material layer and a sintering condition may be determined by a measuring result of product height already formed and/or driving load of blade for equalizing the powder material layer. According to this method, excess thickness of the powder material for lower density layer can be certainly avoided.

According to a fourth aspect of the present invention, when a lower density layer is formed on a higher density layer, the higher density layer is formed larger in thickness than a determined value and then shaved off to the determined thickness. Therefore, a thickness of powder material for the lower density layer can be set to a predetermined value on the surface of the higher density layer which is positioned at a predetermined height, so that the powder material layer can be sintered by the optical beam having a suitable condition and then formation of a bad adherence lower density layer can be avoided.

As described above, according to the present invention, a thickness of a powder material for the lower density layer can be controlled to not larger than a predetermined value by existence of the middle density layer, control of thickness of powder material for the lower density layer and formation of additional higher density layer, so that formation of bad adhesive lower density layers and separation between the higher density layer and the lower density layer can be avoid.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 5 is a schematic explanation view of a method of making a three-dimensional object according to a fifth embodiment of the present invention;

FIGS. 16 to 18 are schematic elevational explanation views showing problems occurring in conventional methods;

DETAILED DESCRIPTION OF THE PREFERRED EMBODIMENTS

Figure 1:
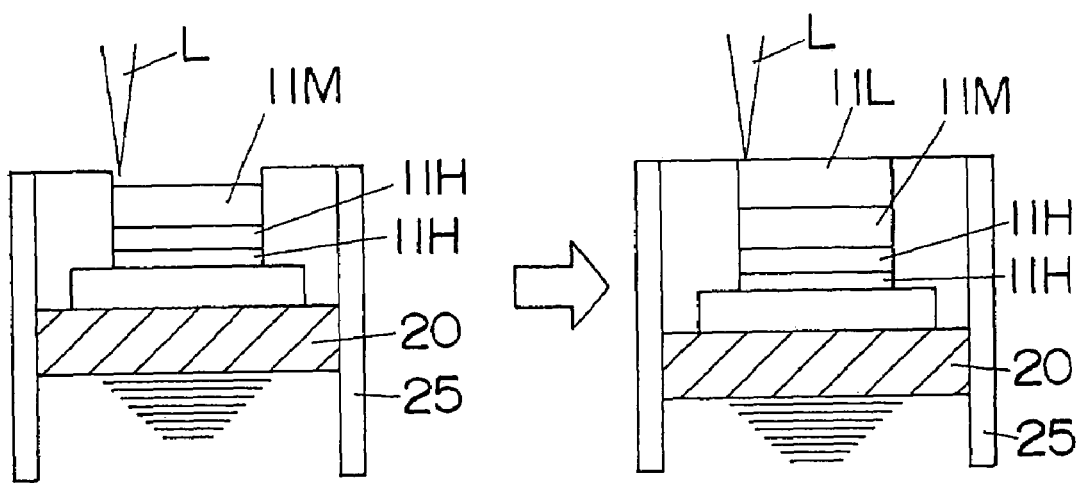
FIG. 1 is a schematic explanation view of a method of making a three-dimensional object according to a first embodiment of the present invention.

This application is based on applications Nos. 2002-287768 and 2003-281259 filed Sep. 30, 2002 and Jul. 28, 2003, respectively, in Japan, the content of which is herein expressly incorporated by reference in its entirety.

In this invention method, there can be used different kinds of apparatus for making a three-dimensional sintered product. Referring now to the drawings, those embodiments were carried out in an apparatus where in a molding tank 25, there is positioned a stage 20 which is going up and down. The powder material is supplied on the stage 20 to form a powder material layer 10 having a predetermined thickness by a squeezing blade. Then, a predetermined portion of the powder material layer is irradiated by an optical bean (laser) L operated with a scan optical system to form a sintered layer 11.

The optical beam system for irradiating an optical beam is provided with control means for changing a scanning pitch and a scanning speed. A higher density sintered layer can be formed by a high sintering condition having a smaller scanning pitch and a slower scanning speed. On the other hand, a lower density sintered layer can be formed by a low scanning condition having a larger scanning pitch and a faster scanning speed. Of course, output of the optical beam may be changed according to a predetermined control schedule.

Figure 13:
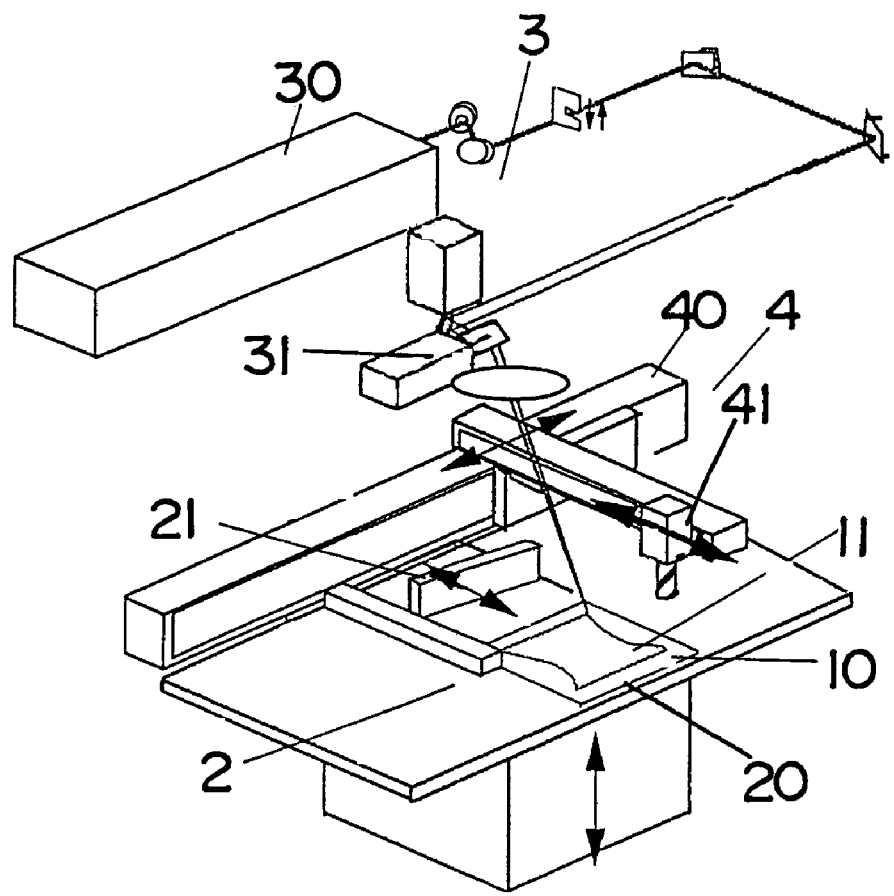
FIG. 13 is a schematic perspective view of an apparatus for carrying out the present invention method.

In detail, there is shown in FIG. 13 an apparatus for making a three-dimensional object according to a first embodiment of the present invention. The apparatus shown therein includes a powder layer-forming unit 2 for forming a powder layer 10, a sintered layer-forming unit 3 for forming a sintered layer 11, and a surface layer-removing unit 4 for removing a low-density surface layer. The powder layer-forming unit 2 forms the powder layer 10 of a desired thickness $\Delta t1$ by supplying organic or inorganic powder material on a sintering table 20 that moves vertically within a space surrounded by a cylinder and by leveling the powder material with the use of a leveling blade 21. The sintering table 20 is driven by a drive unit 5 so as to move up and down. The sintered layer-forming unit 3 forms the sintered layer 11 by irradiating a laser emitted from a laser beam generator 30 on the powder layer 10 via a scanning optical system including a deflector 31 and the like. A laser oscillator is preferably used as the laser beam generator 30. The surface layer-removing unit 4 includes an XY drive Unit 40 mounted on a base thereof and a finishing machine 41 mounted on the XY drive unit 40. It is preferred that the XY drive unit 40 be driven at a high speed using a linear motor. A galvanomirror is preferably used as the deflector 31. A cutting machine such, for example, as an end mill or a drilling machine, a laser beam machine, or a blasting machine for carrying out plastic working with respect to an object by blowing sintered powder against it is preferably used as the finishing machine 41. A polar coordinates drive unit may be used in place of the XY drive unit 40.

Figure 11:
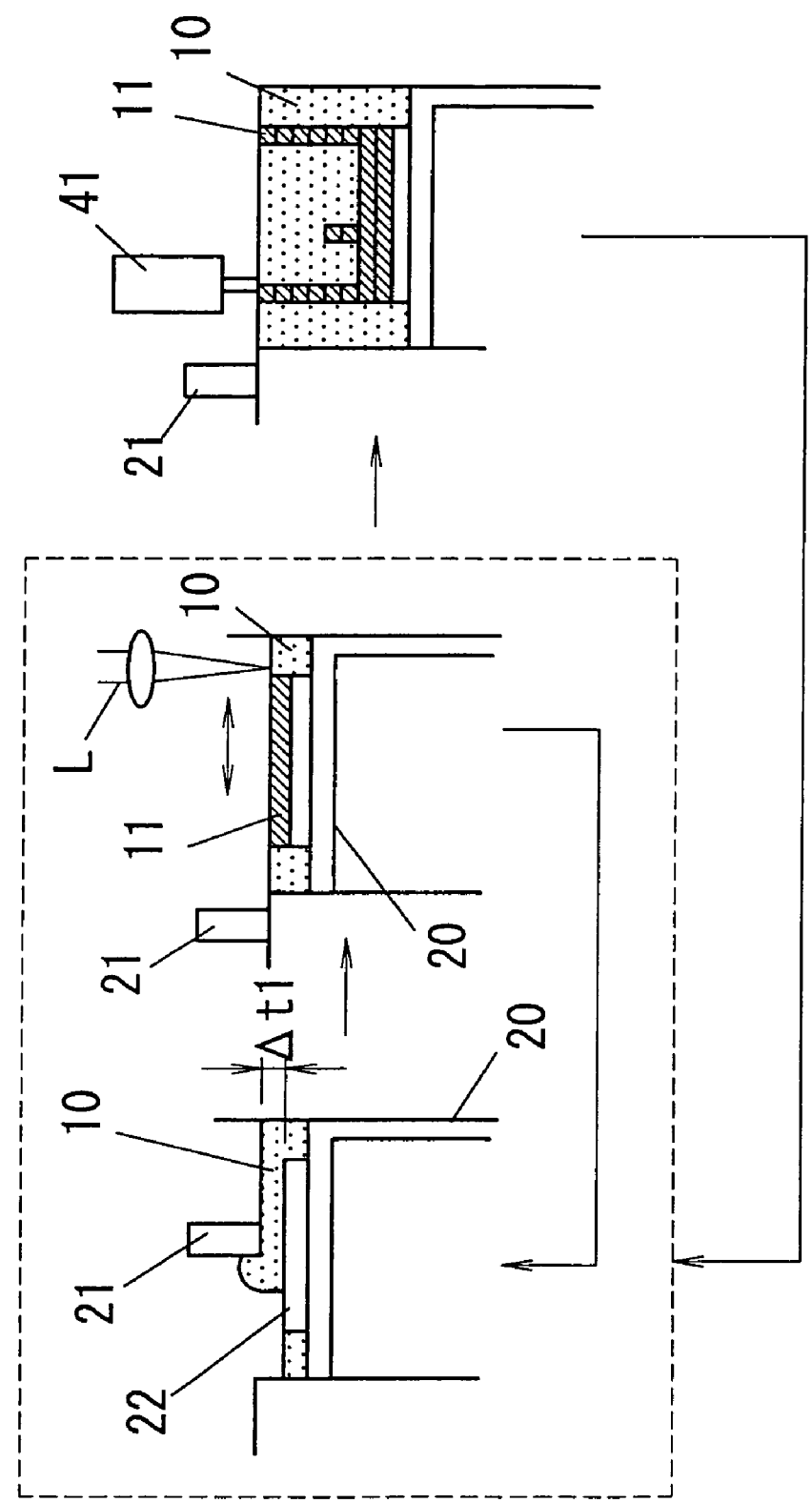
FIG. 11 is schematic elevational views for showing steps of making a three-dimensional sintered product according to the present invention.

FIG. 11 depicts how to make a three-dimensional object using the apparatus referred to above. As shown therein, the organic or inorganic powder material is first supplied on a base 22 mounted on the sintering table 20, which is employed as a distance regulator for regulating the distance between the sintered layer-forming unit 3 and a sintered layer. The powder material supplied on the base 22 is then leveled by the leveling blade 21 to form a first powder layer 10, and an optical beam (laser beam) L is irradiated on a desired portion of the first powder layer 10 to sinter it, thereby forming a sintered layer 11 united with the base 22.

Thereafter, the sintering table 20 is lowered by a predetermined length, and a second powder layer 10 is formed by supplying the powder material again and by leveling it using the leveling blade 21. The optical beam L is again irradiated on a desired portion of the second powder layer 10 to sinter it, thereby forming another sintered layer 11 united with the underlying sintered layer 11.

The process of forming a new powder layer 10 after the sintering table 20 has been lowered and the process of irradiating the optical beam L on a desired portion of the new powder layer 10 to form a new sintered layer 11 are repeatedly carried out, thereby making the three-dimensional object. Generally spherical iron powder particles having an average diameter of about 20 μm are preferably used for the powder material, and a $CO_2$ laser is preferably used as the optical beam. The preferred thickness $\Delta t1$ of each powder layer 10 is about 0.05 mm.

Figure 12:
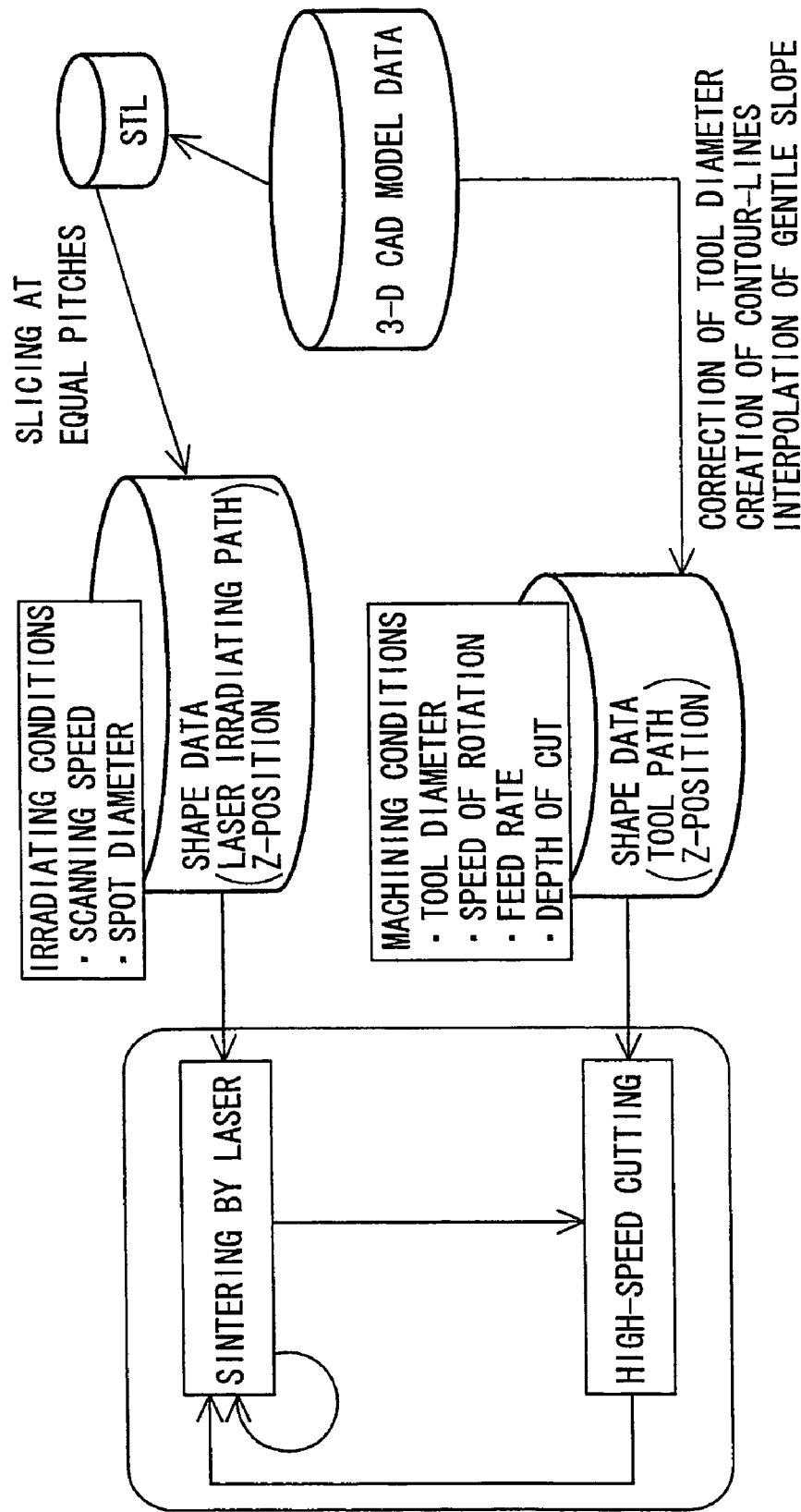
FIG. 12 is a data flow showing how to make a three-dimensional sintered product according to the present invention.

FIG. 12 schematically depicts an example of a data flow according to the present invention. This data flow makes a desired three-dimensional CAD model have two kinds of data, data indicative of a path for laser irradiation and data indicative of a path for cutting. These paths are prepared from three-dimensional CAD data designed in advance to indicate the desired shape.

The path for laser irradiation is substantially the same as that in the conventional shaping method, in which the target shape is defined by contour data for each section that has been obtained by slicing STL data, created from the three-dimensional CAD model, at equal pitches (0.05 mm in this embodiment). The contour data are added with laser irradiation conditions (the scanning speed, spot diameter, power and the like) to create new data, which are in turn delivered to the finishing process.

The path for cutting is a path obtained in consideration of the diameter, kind, feed rate, speed of rotation etc. of the finishing tool to be used in the three-dimensional CAM. The data indicative of this path are also delivered to the finishing process.

The data indicative of the path for laser irradiation are used in a laser sintering process, while the data indicative of the path for cutting are used in a high-speed cutting process. These two processes are repeatedly carried out to finish the target object.

Figure 14:
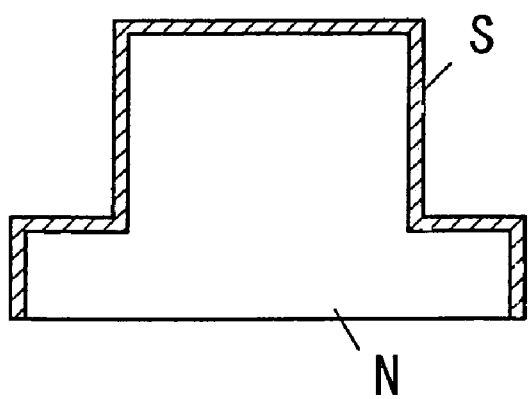
FIG. 14 is a schematic elevational view of a model having a higher density region.

It is preferred that the irradiation of the optical beam be conducted so that at least the surface region of the three-dimensional object is sintered to have a high density (for example, a porosity less than 5%). The reason for this is that even if the surface layer is removed by the surface layer-removing unit 4 and if the surface region has a low density, the surface exposed after the surface removing process is still porous. Accordingly, the model data are divided into those for the surface region S and those for the inner region N, as shown in FIG. 14, and the optical beam is irradiated under the conditions in which the inner region N comes to be porous and the surface region S comes to have a high density upon melting of most of the powder material therein.

Figure 15A:
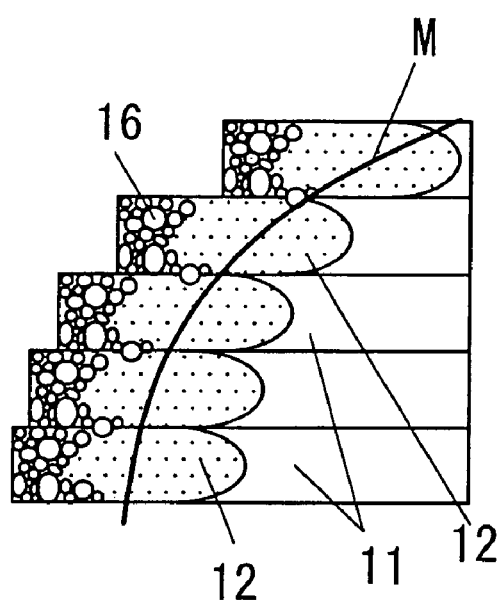
FIGS. 15A and 15B are vertical sectional view of a plurality of sintered layers as it is after made by the present invention and a plurality of sintered layers after a surface region thereof has been removed.

In FIG. 15A, reference numeral 12 denotes a high-density region, and reference numeral 16 denotes a low-density surface layer that has been created by the adhesion of the powder material, as discussed above. The inner portion located inside the high-density region 12 has a density lower than that of the high-density region 12 but higher than that of the low-density surface layer 16.

During the formation of a plurality of sintered layers 11, when the total thickness thereof reaches a specific value that has been determined from the tool length of a milling head 41, for example, the surface layer-removing unit 4 is activated to cut the surface of the three-dimensional object that has been shaped by that time. For example, a tool (ball end mill) of the milling head 41 having a diameter of 1 mm and an effective blade length of 3 mm can achieve cutting of a depth of 3 mm. Accordingly, if the thickness $\Delta t1$ of the powder layer 10 is 0.05 mm, the surface layer-removing unit 4 is activated when sixty sintered layers 11 have been formed.

Figure 15B:
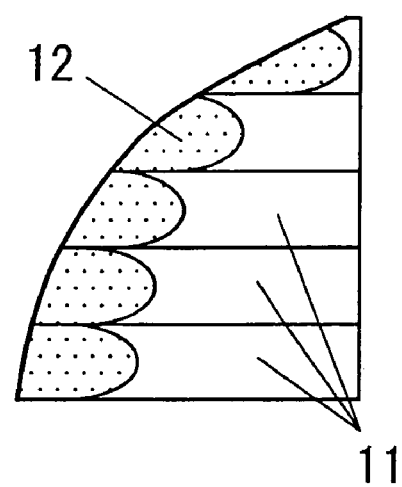
Figure 17:
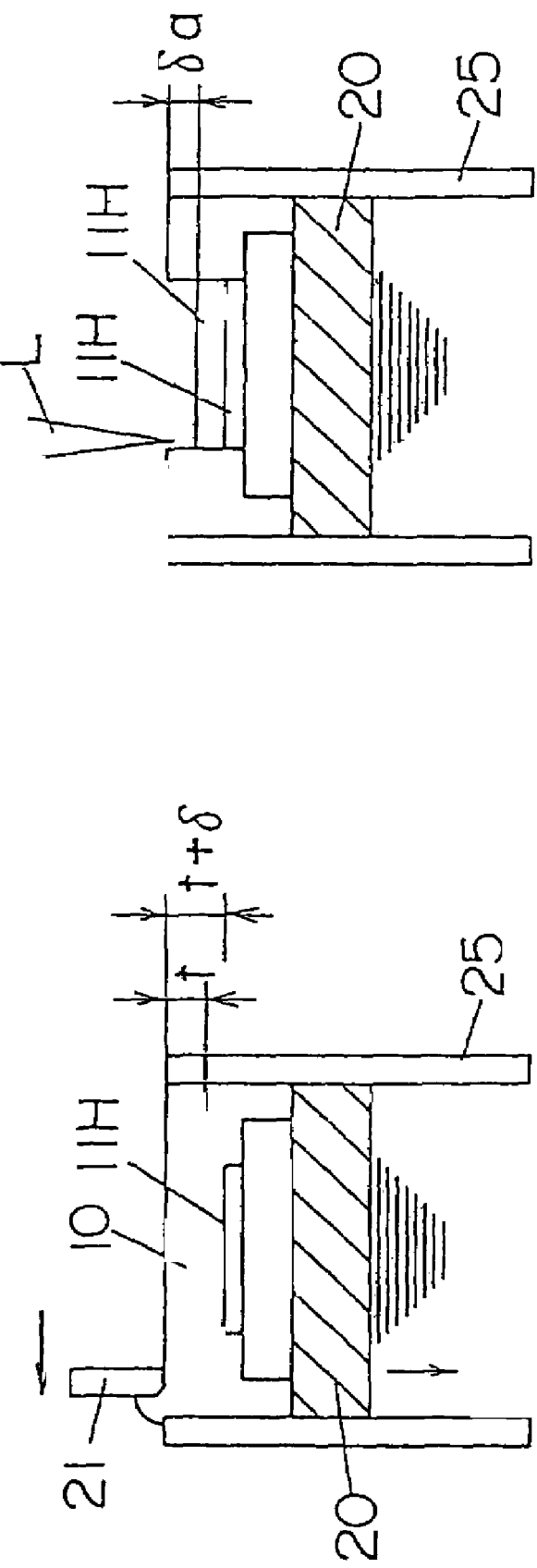

As shown in FIG. 15A, such surface layer-removing unit 4 can remove the low-density surface layer 16 created by the adhesion of the powder to the surface of the shaped object and can simultaneously cut out a portion of the high-density region 12, thereby exposing the high-density region 12 over the entire surface of the shaped object, as shown in FIG. 15B. To this end, the shape of the sintered layers 11 is formed into a size slightly greater than that of a desired shape M.

By way of example, when the optical laser L is irradiated along a desired contour line under the conditions given below, the horizontal size (width) of each sintered layer 11 comes to be about 0.3 mm greater than that of the desired shape M.

Laser Power: 200 W
Laser Spot Diameter: 0.6 mm
Scanning Speed: 50 mm/s

The excess thickness in the vertical direction may be equal to or different from that in the horizontal direction. The vertical size of the shape of the sintered layers 11 is obtained by modifying the original data indicative of the vertical size of the desired shape M. In the case where the cutting is carried out using a ball end mill of a diameter of 1 mm, it is preferred that the depth of cut, the feed rate, and the speed of rotation of the tool be set to 0.1–0.5 mm, 5–50 m/min, and 20,000–100,000 rpm, respectively.

EXAMPLES

As shown in FIG. 1, on the stage 20, there were formed two higher density sintered layers 11H, 11H by a high density sintering condition such as laser power 200 W, scanning pitch 0.2 mm, scanning speed 50 mm/sec. After that, an intermediate layer 11M was formed by the optical beam L under a medium density sintering condition such as laser power 200 W, scanning pitch 0.3 mm, scanning speed 100 mm/sec and then a lower density layer 11L was formed by the optical beam under a low density sintering condition such as laser power 200 W, scanning pitch 0.5 mm, scanning speed 300 mm/sec. In this example, even if the layer 10 of powder material has a larger thickness than that for the lower density sintering condition, the medium density sintering condition is enough to give the layer of powder material having the larger thickness to be sintered completely, thereby separation between the medium density layer 11M and the higher density layer 11H being avoided.

Figure 2:
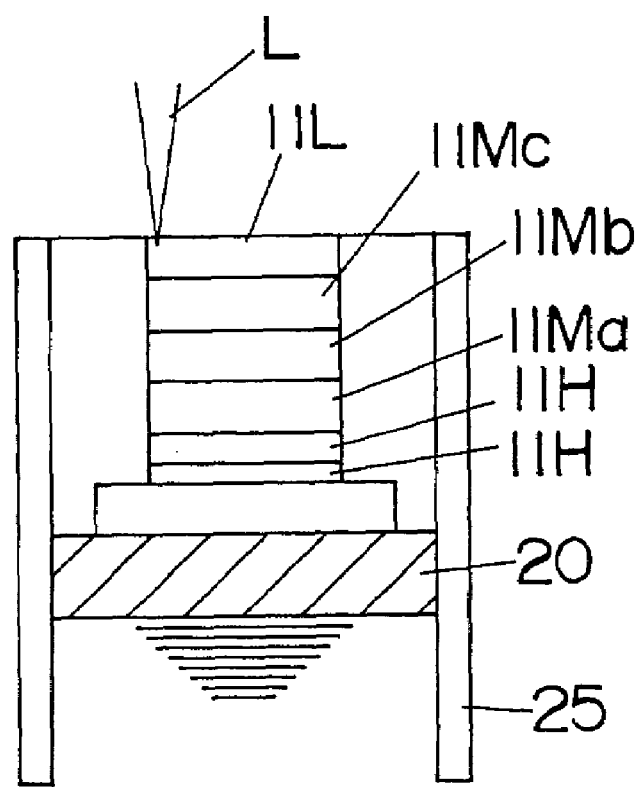
FIG. 2 is a schematic explanation view of a method of making a three-dimensional object according to a second embodiment of the present invention.

As shown in FIG. 2, the medium intermediate layer may comprises a plurality of layers 11Ma, 11Mb and 11Mc, sintering conditions for which decrease according to the distance to the lower density layer. For example, the medium density layer 11Ma closer to the higher density layer 11H will be set to a sintering condition such as laser power 200 W, scanning pitch 0.3 mm, scanning speed 100 mm/sec and the medium density layer 11Mb will be set to a sintering condition such as laser power 200 W, scanning pitch 0.35 mm, scanning speed 150 mm/sec while the medium density layer 11Mc closer to the lower density layer 11L will be set to a sintering condition such as laser power 200 W, scanning pitch 0.4 mm, scanning speed 200 mm/sec. In stead of this condition, under the same condition as laser power and scanning pitch as the lower density sintering condition, the scanning speed may be controlled higher as the layers become closer to the lower density layer.

Figure 3:
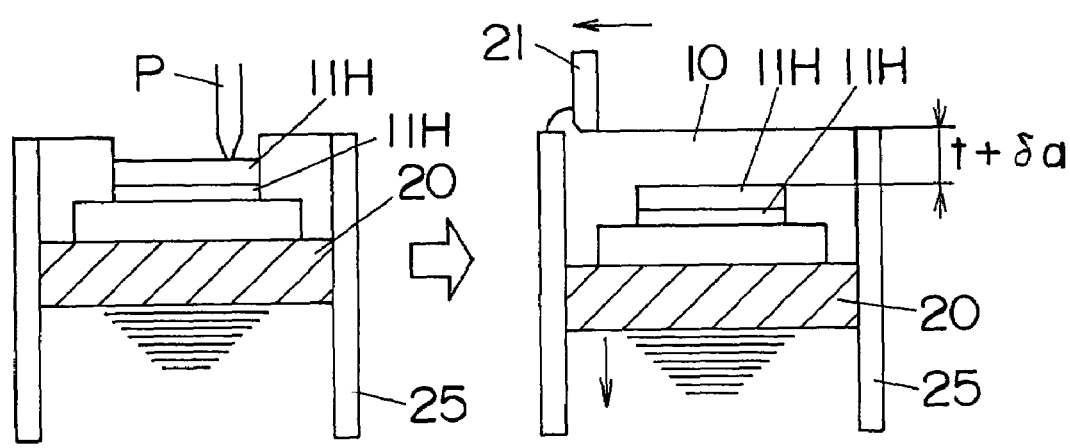
FIG. 3 is a schematic explanation view of a method of making a three-dimensional object according to a third embodiment of the present invention.

As shown in FIG. 3, after the higher density layer is formed, the difference δa between the powder material layer and the higher density layer can be measured by a probe P for measuring height and also a thickness (t+δa) of next powder material layers is measured and then according to the measuring result, a sintering condition for the medium density layers 11M may be determined. A suitable condition for the medium density layer can be predetermined according to experimental data and so on.

Figure 4:
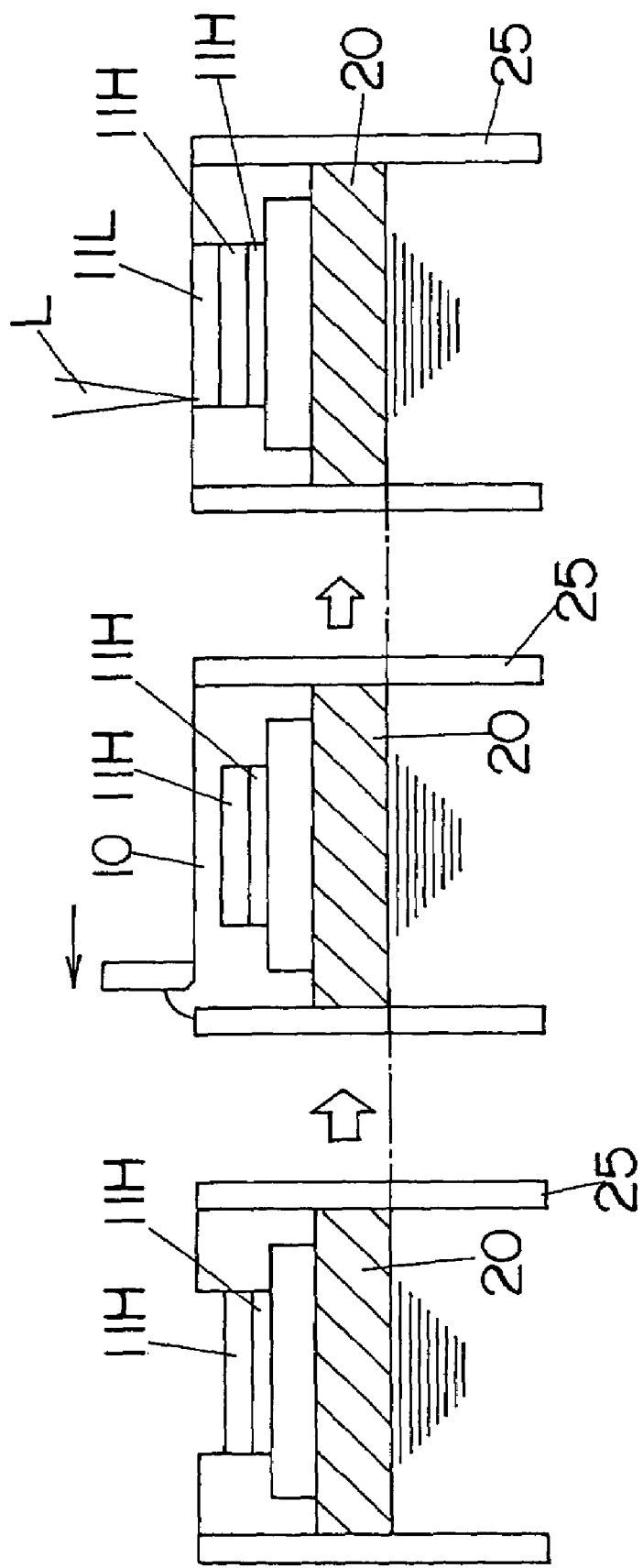
FIG. 4 is a schematic explanation view of a method of making a three-dimensional object according to a fourth embodiment of the present invention.

Furthermore, as shown in FIG. 4, when a lower density layer 11L is formed on the higher density layer 11H, a sinking amount (including zero) of the stage 20 may be set to a smaller value than a predetermined value (t), thereby giving a next powder layer a suitable thickness for the lower density layer 11L under the low density sintering condition.

Further, as shown in FIG. 5, in order to cancel the difference δa between the powder material layer 10 and the higher density layer 11H, after sintering the higher density layer the stage is not lowered or lowered smaller than a predetermined value (t) and powder material is supplied to fill the space. Under the condition, an additional higher density layer 11H' is formed to cancel the difference and then a lower density layer may be formed under a lower density sintering condition. In case of larger difference, a plurality of additional higher density layers may be formed according to the above procedure. The thickness of the additional higher density layers may become thinner gradually and finally a lower density layer will be formed. In FIG. 5, 21 denotes a squeezing blade.

Figure 6A:
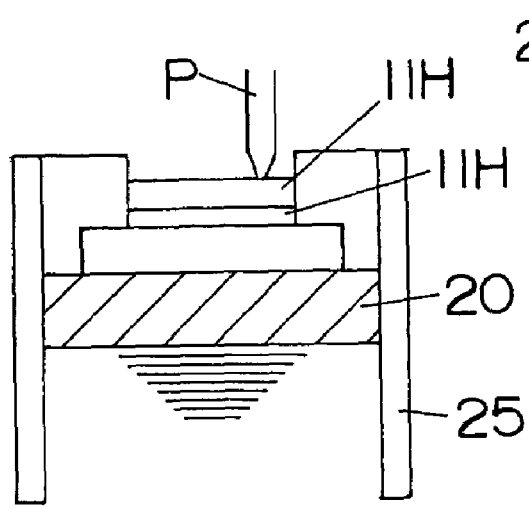
FIGS. 6A and 6B are schematic explanation views to show a measuring step and a setting step of a layer of powder material for a lower density layer.
Figure 6B:
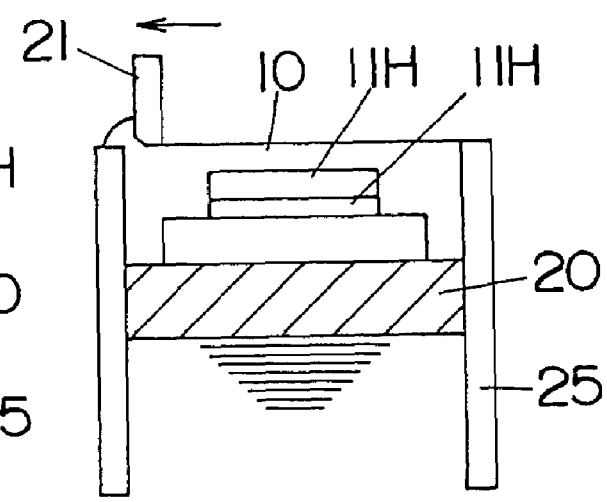

Furthermore, as shown in FIG. 6A, when the difference between the powder layer 10 and the higher density layer 11H is measured, according to a measuring result, the next step can be selected from the following steps: a) a lower density layer 11L is formed after formation of the additional higher density layer 11H' or b) a lower density layer 11L is formed directly on the higher density layer 11L without the additional layer 11H'. In case of larger difference δa, as shown in FIG. 6B, a layer of powder material is formed without sinking of the stage 20 and the layer of powder material is sintered to a higher density layer 11H' to make the difference smaller. In case of smaller difference δa, the stage 20 is lowered, the powder material is supplied and the lower density layer 11L is formed.

Figure 7A:
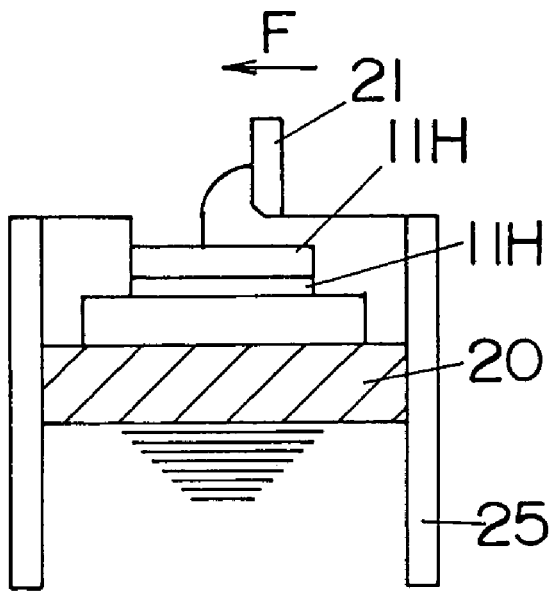
FIGS. 7A and 7B are schematic explanation views to show a measuring step and a setting step of a layer of powder material for a higher density layer and FIG. 7C is a graph showing a driving load change of a blade for equalizing a layer of powder material.
Figure 7B:
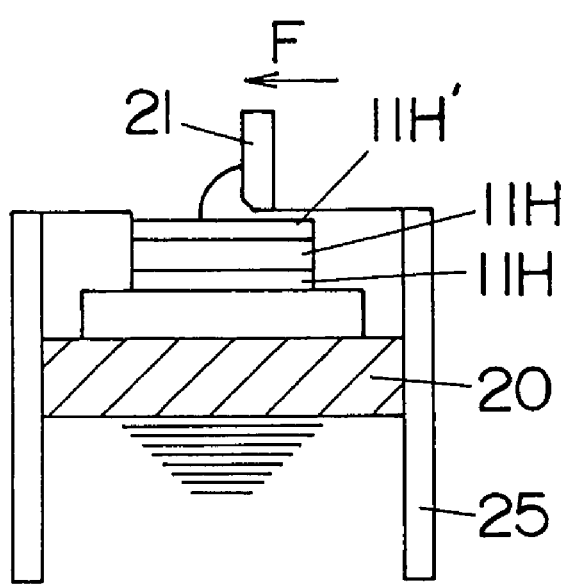

As shown in FIG. 7, the difference δa can be measured by a driving load F of the blade 21 which is used for equalizing the powder material. In case of a smaller load F equal to a large difference shown in FIG. 7A, a next powder material is formed without sinking of the stage 20. In case of a larger load F equal to a small difference shown in FIG. 7B, a next powder material is formed with some sinking amount of the stage 20.

Figure 7C:
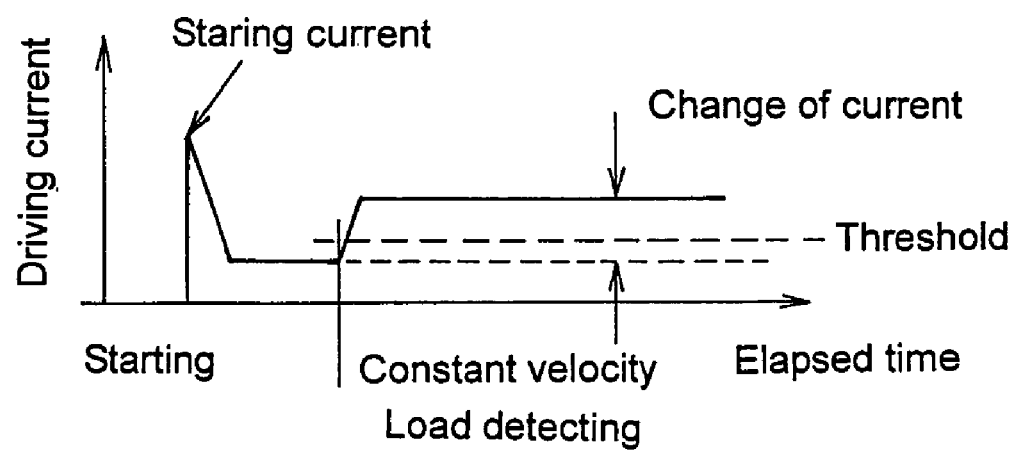

As shown in FIG. 7C, a large load of the blade 21 makes the current in driving motor larger according to the load while a small load makes the current smaller and approaches to a lowest driving value. Therefore, when the blade is passing on the sintered surface, normally the blade tends to receive a resistance due to roughness of the surface. However, if the blade is passing above the surface, the blade receives no load. Accordingly, as shown in FIG. 7C, the current value is monitored during constant moving and according to comparison between the current value thus obtained and a predetermined value it is necessary to determine whether the stage 20 should be lowered or not.

Figure 8:
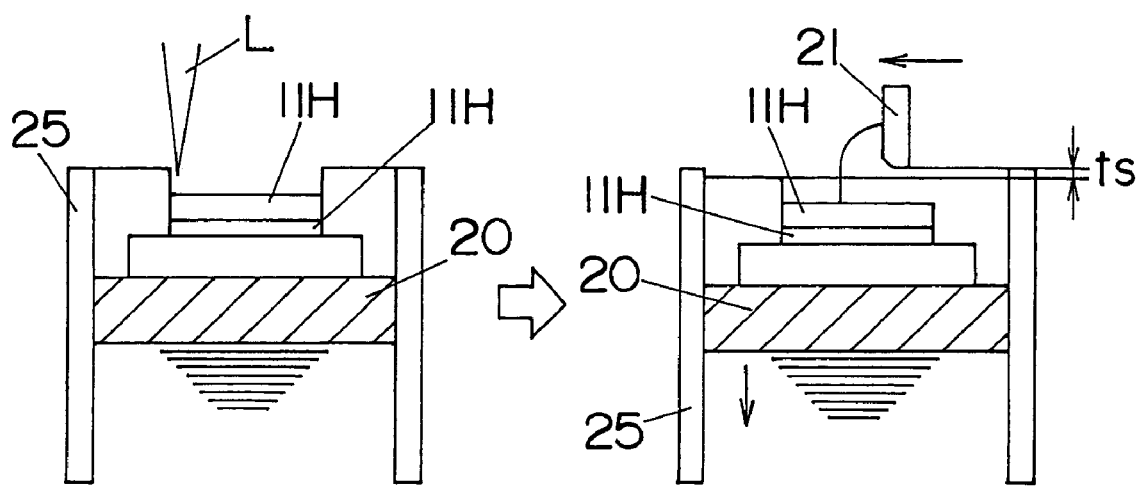
FIG. 8 is a schematic explanation view of a method of making a three-dimensional object according to a fifth embodiment of the present invention.

Further, as shown in FIG. 8, when the layer to be sintered is changed from the higher density layer to the lower density layer, a sinking amount of stage 20 should be changed from a predetermined value t (50 μm) to a smaller value ts (for example 20 μm) and a layer of powder material may be formed and sintered under a low density sintering condition to form the lower density layer 11L.

Figure 9:
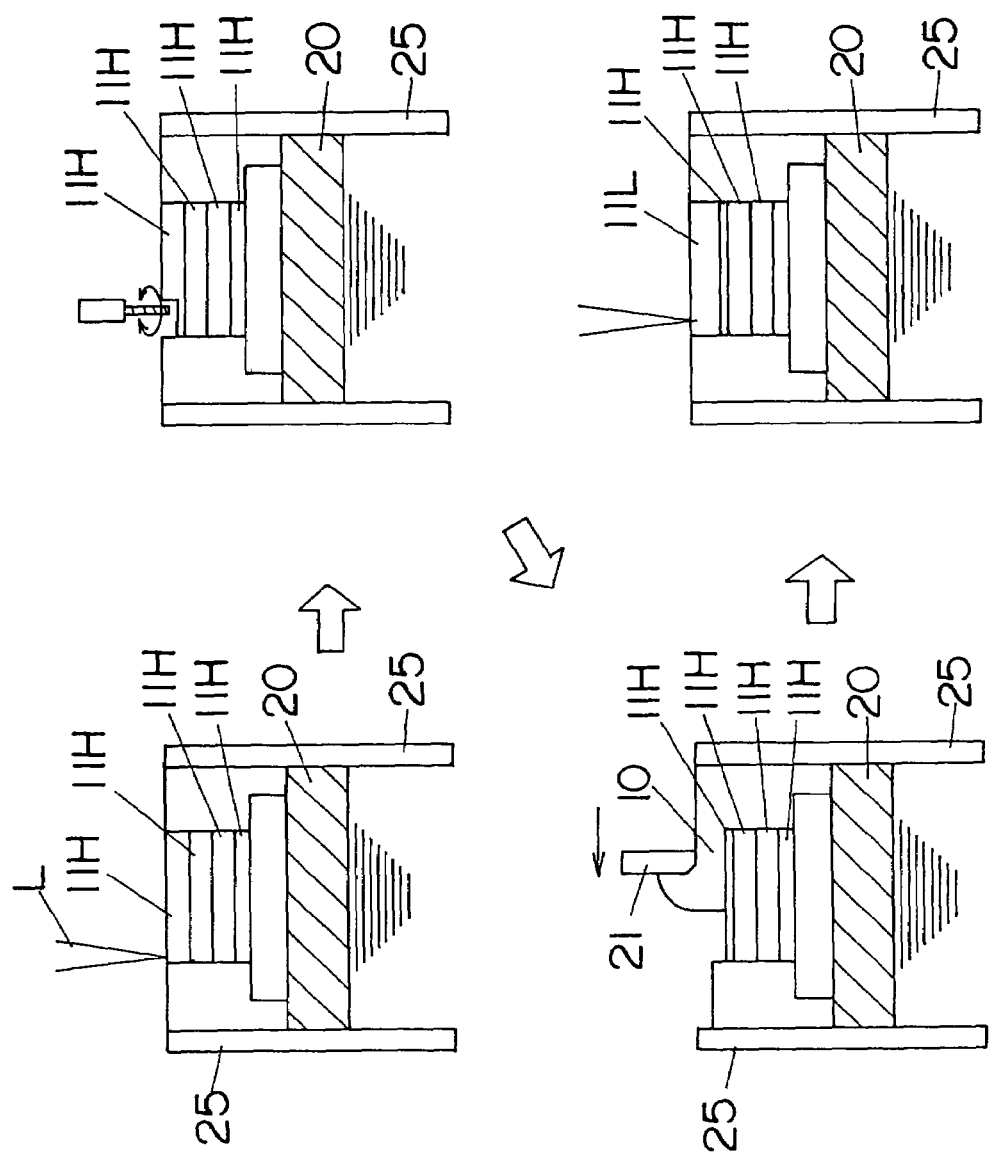
FIG. 9 is a schematic explanation view of a method of making a three-dimensional object according to a sixth embodiment of the present invention.

Furthermore, as shown in FIG. 9, when the layer to be sintered is changed from the higher density layer to the lower density layer, a higher density layer 11H having a little bit larger than a predetermined value is formed and shaved off to a predetermined value and then a layer of powder material may be formed and sintered under a low density sintering condition to form the lower density layer 11L.

Figure 10:
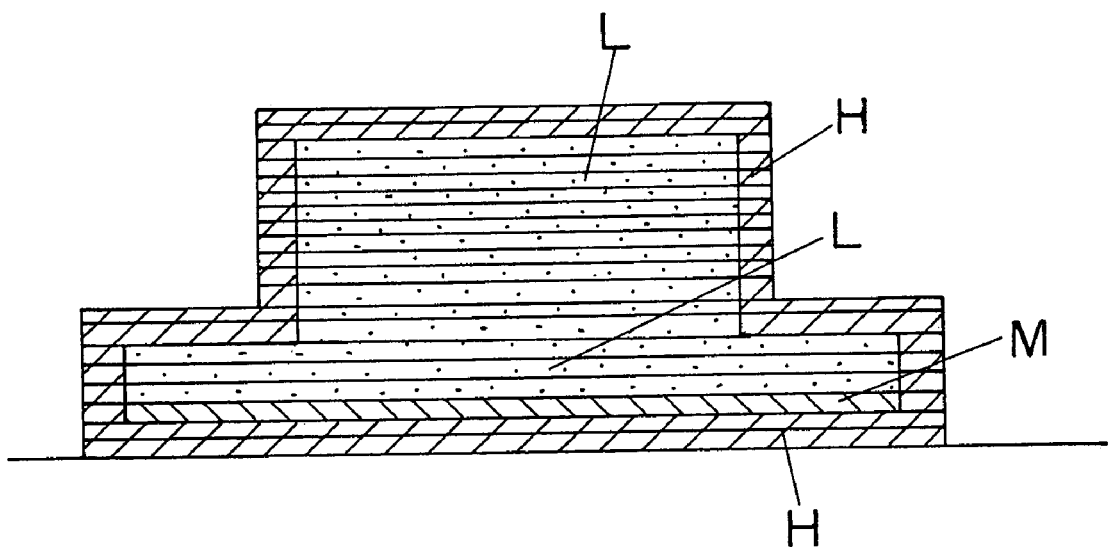
FIG. 10 is a sectional view of a resulting sintered product made by the present invention method.

In each examples, although conditions for a high, medium and low density sintering were shown as typical examples, one sintered layer may include higher density portions and lower density portions. As shown in FIG. 10, a sintered layer including a lower density portion is formed on another sintered layer including a higher density portion. In FIG. 10, M denotes a medium density portion.

In the present invention, as inorganic powder material, there can be used ferrous powder mixture such as mixture of ferrous powder of 50 weight % and non-ferrous powder selected from the group consisting nickel, nickel alloy, copper and copper alloy.

The typical mixture comprises Cr—Mo—Fe alloy of 70 to 90 wt. %, P—Cu or Mn—Cu alloy of 5 to 30 Wt. % and Nickel of 0 to 10 wt. %. The average powder size is between 0.1 to 200 µm, preferably 1 to 100 µm, more preferably 5 to 50 µm. The present invention can be applied to organic powder material.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of preparing a three-dimensional sintered product which comprises (a) sintering a predetermined portion of a first powder material layer by irradiation of a first optical beam to form a first layer having a higher density, (b) forming a second powder material layer on the first layer and (c) sintering a predetermined portion of the second powder material layer by irradiation of a second optical beam to form a second layer having a lower density and bond the second lower density layer to the first higher density layer and (d) repeating (a) to (c) to form a three-dimensional sintered block comprising a plurality of the first and second layers, wherein, after an additional intermediate layer having a density equal to or lower than that of the first higher density layer, is formed on the higher density layer which is sintered smaller in thickness than a predetermined value, the second lower density layer is formed through the additional intermediate layer on the first higher density layer.

2. A method of preparing a three-dimensional sintered product according to claim 1, wherein the additional intermediate layer is a middle density sintered layer and comprises a plurality of layers which density decreases from that of the higher density to that of the lower density according to the layer position.

3. A method of preparing a three-dimensional sintered product according to claim 1, wherein a sintering condition for the intermediate layer is determined according to a thickness of the powder material layer.

4. A method of preparing a three-dimensional sintered product according to claim 1, wherein when a powder material layer having a thickness smaller than a predetermined value is formed on the top layer of the higher density layers and the thickness of the powder material layer is determined by a sinking amount of the stage where the powder material layer is formed, an additional powder material layer is formed without sinking of the stage.

5. A method of preparing a three-dimensional sintered product according to claim 1, wherein when the second lower density layer is formed on the first higher density layer, the position of the higher density layer is measured and according to the measuring result, a thickness and a sintering condition of next powder material layer is determined.

6. A method of preparing a three-dimensional sintered product according to claim 1, wherein when the second lower density layer is formed on the first higher density layer, a driving load of blade for leveling the powder material layer is measured and according to the measuring result, a thickness and a sintering condition of next powder material layer is determined.

7. A method of preparing a three-dimensional sintered product according to claim 1, wherein the three-dimensional sintered product is a metal mold and is made of powder material having an average powder size of 0.1 to 200 micron and comprising ferrous powder and one or more of nonferrous metal powders consisting of nickel, nickel alloy, copper, and copper alloy.

8. A method of preparing a three-dimensional sintered product according to claim 2, wherein a sintering condition for the intermediate layer is determined according to a thickness of the powder material layer.

9. A method of preparing a three-dimensional sintered product according to claim 1, wherein the plurality of first and second layers are made of the same material.

* * * * *